United States Patent
Martyn

[15] 3,684,905
[45] Aug. 15, 1972

[54] PIEZOELECTRIC CRYSTAL DEVICE INCLUDING LOADING ELEMENTS HAVING THE SHAPE OF CHORDAL SECTIONS

[72] Inventor: Lloyd G. Martyn, Mt. Holly Springs, Pa.

[73] Assignee: McCoy Electronics Company, Mount Holly Springs, Pa.

[22] Filed: April 15, 1971

[21] Appl. No.: 134,292

[52] U.S. Cl. ......................310/8.2, 310/9.4, 310/9.7
[51] Int. Cl. ..............................................H01v 7/00
[58] Field of Search...........310/8.2, 9.7, 9.8, 9.4, 9.1, 310/8.1, 8

[56] References Cited

UNITED STATES PATENTS

| | | | |
|---|---|---|---|
| 3,585,418 | 6/1971 | Koneral | 310/8.2 |
| 3,382,381 | 5/1968 | Horton | 310/8.5 X |
| 3,564,463 | 2/1971 | Bearer et al. | 310/9.8 X |
| 3,165,651 | 1/1965 | Bechmann | 310/9.7 |

FOREIGN PATENTS OR APPLICATIONS

| | | | |
|---|---|---|---|
| 497,732 | 7/1948 | Canada | 310/9.7 |

*Primary Examiner*—J. V. Truhe
*Assistant Examiner*—B. A. Reynolds
*Attorney*—Beveridge & DeGrandi

[57] ABSTRACT

A piezoelectric crystal device employing a novel electrode/loading element configuration for the suppression of spurious modes of oscillation. A substantially diamond-shaped electrode is disposed at the center of each face of the crystal device and a pair of loading elements, each loading element having the shape of a chordal section of a circle, are disposed on the edges of each face. A metallic tab extends from each electrode to one loading element on each face and the electrode and loading elements are positioned so that a line running through and bisecting one of the angular corners of the diamond-shaped electrode is perpendicular to the chordal edges of the loading elements.

11 Claims, 8 Drawing Figures

INVENTOR
LLOYD MARTYN

BY Beveridge & De Grandi

ATTORNEYS

DIAMOND ELECTRODE WITH CHORDAL LOADING SECTION NOT PERPENDICULAR

DIAMOND ELECTRODE WITHOUT CHORDAL LOADING SECTION

DIAMOND ELECTRODE WITH CHORDAL LOADING SECTION PERPENDICULAR

PIEZOELECTRIC CRYSTAL DEVICE INCLUDING LOADING ELEMENTS HAVING THE SHAPE OF CHORDAL SECTIONS

This invention relates to a high-frequency piezoelectric crystal device, more particularly to a high-frequency piezoelectric crystal device having an improved frequency response.

A piezoelectric crystal has the property of oscillating at a predominant resonant mode when a voltage is applied across its surfaces. This property has caused piezoelectric crystals to find extensive use as electrical filters. One problem associated with the use of piezoelectric crystals as filters is that they tend to oscillate at modes other than the predominant resonant mode. These other modes of oscillation are known as spurious modes and seriously impair the filtering properties of the piezoelectric crystal. It is the purpose of this invention to provide a piezoelectric crystal device which is substantially free of spurious modes of oscillation.

U.S. Pat. Nos. 3,382,381, 2,635,199, 2,994,791, 2,509,478, 2,807,731 and 2,595,037, are directed to the problem of eliminating spurious modes of oscillation in piezoelectric crystals. One technique employed by these patents to achieve suppression of undesirable modes is to provide the crystal blank with an electrode located substantially in the center of the blank and a mechanical loading element located elsewhere on the blank with the loading element defining a path leading to the edge of the blank. The predominant mode frequency is controlled by the thickness of the electrode and the crystal blank. The mechanical loading element acts as a high pass filter, isolating the predominant mode frequency of oscillation within the central area of the crystal and passing all higher frequencies, including the spurious modes of oscillation, to the edges of the crystal so that they do not control the frequency of oscillation of the crystal body. The cut-off frequency of the mechanical loading element is controlled by the thickness of this loading element. Thus by controlling the thickness of mechanical loading elements in relation to the thickness of the electrodes and crystal blanks undesirable modes of oscillation can be led to the edge of the crystal whereas the predominant mode frequency can be isolated within the central portion of the crystal.

The present invention also employs a central electrode and a loading element leading to the edge of the crystal blank to attain improved frequency response. However, the present invention uses a novel electrode/loading element configuration which results in improved suppression of spurious modes of oscillation. With the particular electrode/loading element configuration of this invention modes of oscillation other than the predominant mode are reduced to negligible magnitudes.

It is therefore an object of the invention to provide a piezoelectric crystal having an improved frequency response.

Briefly, the present invention provides a piezoelectric crystal having disposed on each surface a substantially diamond-shaped electrode and two mechanical loading elements, each loading element being in the shape of a chordal section of a circle. The loading elements are disposed on the edges of the crystal blank and there is a metallic tab extending from each electrode to one loading element on each side. The electrode and mechanical loading elements are positioned on the surface of the crystal blank so that a line running through and bisecting one of the angular corners of the diamond is perpendicular to the chordal edges of the loading elements. The electrode is spaced between 0.001 inch and 0.01 inch from the loading element to which it is connected by the metallic tab.

For a fuller understanding of the invention, reference should be had to the following detailed description taken in conjunction with the accompanying drawings, in which.

Figure 1:
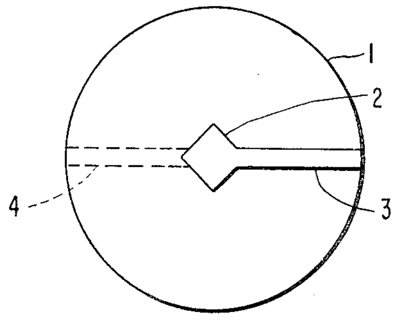
FIG. 1 is a view of the crystal after the initial base plate has been applied.

FIG. 1 shows one surface of quartz blank 1 of the crystal device with substantially diamond shaped electrode 2 and metallic tab 3 plated thereon. The crystal blank is circular and the dotted lines extending from the electrode to the left-hand edge of the blank represent metallic tab 4 which is plated on the side of the crystal not shown.

Figure 2:
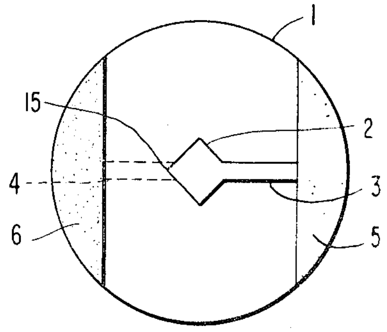
FIGS. 2 and 2A are views of the crystal after the mechanical loading elements have been applied.
Figures 2A, 3, 3A:
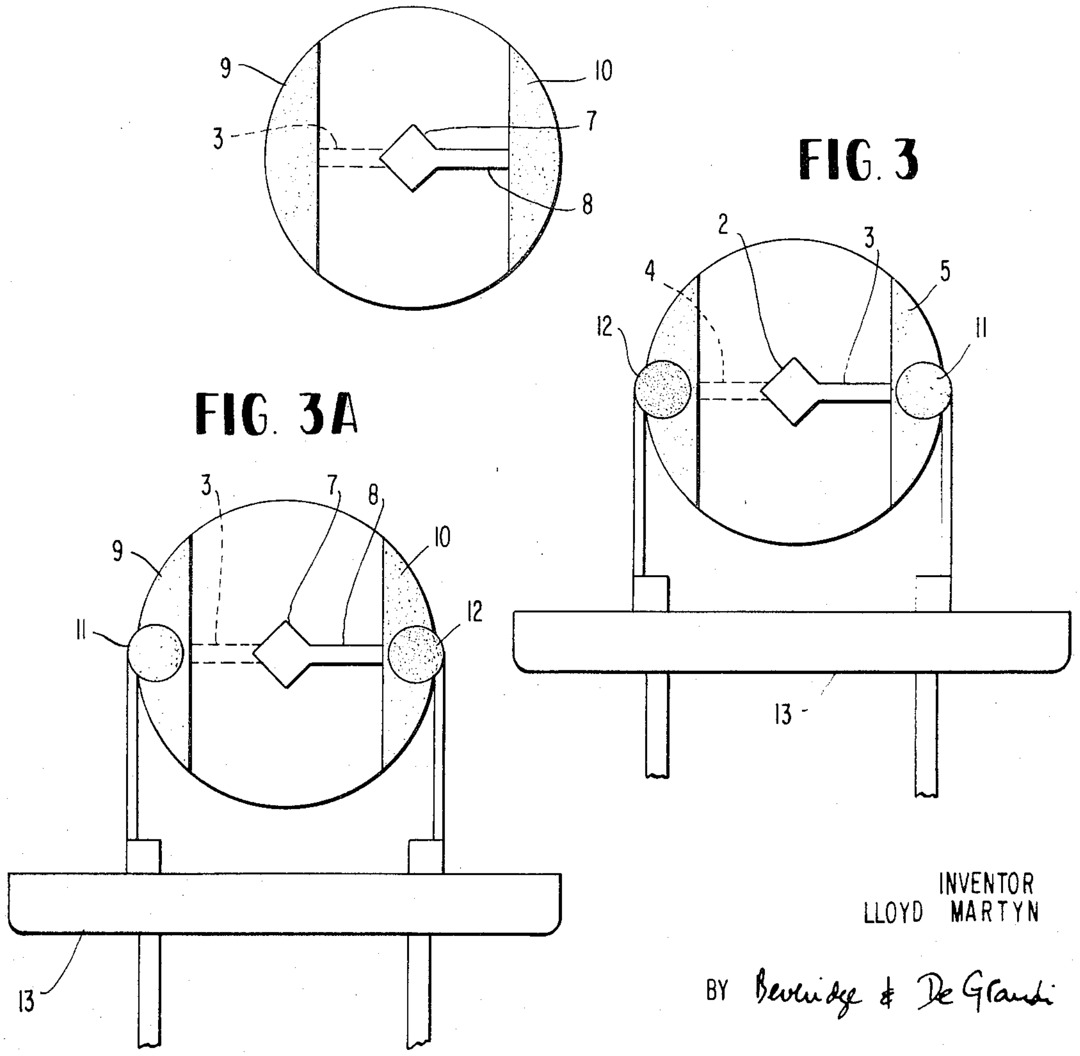
FIGS. 3 and 3A are views of the crystal mounted and cemented in the crystal holder.

FIG. 2 is a view of the same surface of crystal blank 1 shown in FIG. 1 with mechanical loading elements 5 and 6 plated thereon. FIG. 2A is a view of the opposite surface of the crystal blank with electrode 7, metallic tab 8, and mechanical loading elements 9 and 10 plated thereon. Metallic tab 3 is shown in dotted lines because it is located on the opposite side of the blanks. Note that on each surface of the crystal blank one of the two mechanical loading elements on that surface is plated directly over the metallic tab extending from the substantially diamond-shaped electrode. Thus in FIG. 2 mechanical loading element 5 is plated directly over metallic tab 3 and in FIG. 2A mechanical loading element 10 is plated directly over metallic tab 8.

The crystal used in the invention is an A-T cut crystal. The X or electrical axis is the vertical axis in the drawings and the Z or optical axis is the horizontal axis. Thus it is noted in FIGS. 1 to 3 that the angular corners of the substantially diamond shaped electrode are pointed only in the X and Z directions and that the metallic tab extending from the electrode is oriented in the Z direction. The angular corners of the substantially diamond shaped electrode are positioned within 10 degrees of the X- and Z-axis. The spacing between the electrode and the chordal edge of mechanical loading element which is plated over the metallic tab is between 0.001 and 0.01 inches. In FIG. 2 the distance between element 5 and electrode 2 is between 0.001 inch and 0.01 inch. The electrode is positioned so that a line running through the leftmost angular corner of the electrode in the drawings and bisecting this angular corner is perpendicular to the chordal edges of the loading elements. For example, in FIG. 2 angular corner 15 of electrode 2 is bisected by a line which is perpendicular to the chord of chordal section 5. As will be described more fully in conjunction with FIGS. 4 to 6, below, this positioning of the electrode in relation to the chordal edge of the loading section results in an improved frequency response for the piezoelectric crystal.

The loading elements are made to be considerably thicker than the electrodes and tab elements. In a preferred embodiment the electrodes are made of aluminum about 10 angstrom units thick and the mechanical loading elements would be made of silver and would be about 120 angstrom units thick. Although these metals have been used in the preferred embodiment, a variety of other metals could also be used for the electrodes and loading elements, with the only requirement being that the loading elements be substantially thicker or heavier than the electrode elements and shaped as described above. For instance, gold, silver, nickel and copper are examples of metals which could be used for the electrodes or loading elements.

Figure 5:
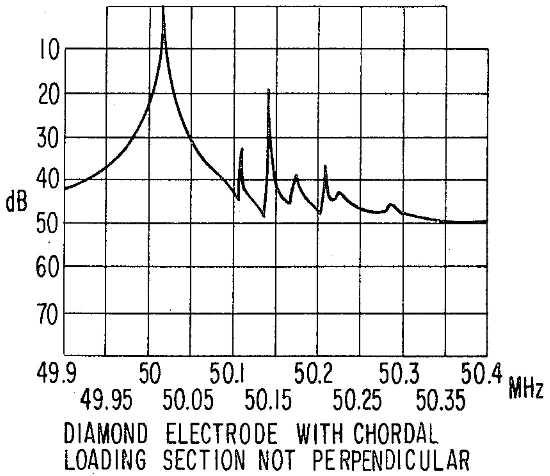
Figure 4:
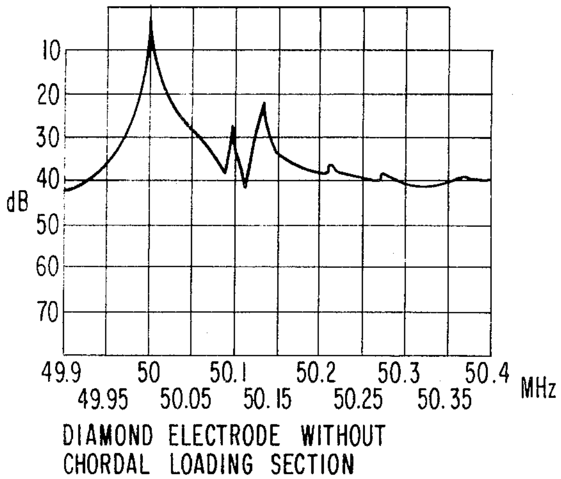
Figure 6:
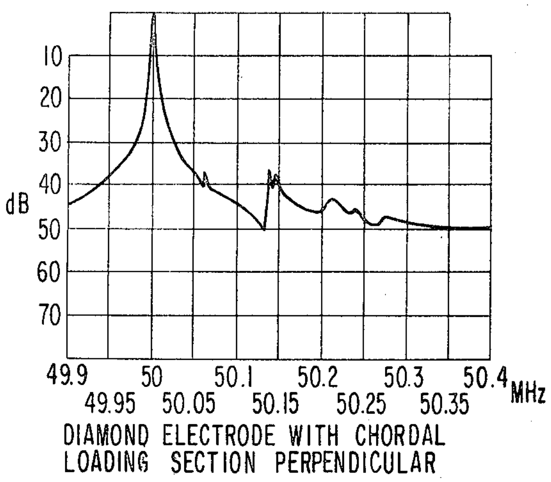

The improved results obtained with the novel electrode/loading element configuration described above are graphically illustrated in FIGS. 4 to 6. FIGS. 4 to 6 are graphs of the spectral response curves of crystals having different electrode/loading element configurations. The ordinate of the graphs of FIGS. 4 to 6 are marked off in decibels and the abscissas are marked off in units of MHZ. Thus it is seen that the predominant mode frequency of the crystal used is approximately 50 MHz. The peaks, other than the peak at approximately 50 MHZ represent the spurious modes of oscillation of the crystal which it is desired to eliminate.

FIG. 4 represents the spectral response of an A-T type crystal having substantially diamond-shaped electrodes but not having any mechanical loading elements. As can be seen, without the use of loading elements there is a substantial spurious response at a frequency between 50.1 and 50.15 MHZ. FIG. 5 shows the spectral response of a piezoelectric crystal using substantially diamond-shaped electrodes in conjunction with loading sections which are in the shape of a chordal section of a circle but which are positioned so that the chordal edges of the loading elements are not perpendicular to the line running through and bisecting the left-most angular corner of the substantially diamond-shaped electrode shown in FIG. 2. It is noted that with this configuration the spurious response at approximately 50.15 MHZ is even greater than without the use of the chordal loading section.

FIG. 6 shows how a much improved result is obtained by using the electrode/loading element configuration according to the present invention. FIG. 6 shows the spectral response of the crystal with the substantially diamond-shaped electrode and chordal loading element positioned as shown in FIG. 2, with the line running through and bisecting the left-most angular corner of the substantially diamond-shaped electrode being perpendicular to the chordal edge of the mechanical loading element which is plated over the tab. With this arrangement it is noted the spurious response at approximately 50.15 MHZ is substantially eliminated and there are virtually no spurious responses present in the spectral response of the crystal. Hence it is seen that the peculiar placement of the substantially diamond-shaped electrode with respect to the mechanical loading elements results in a piezoelectric crystal having a much improved frequency response.

FIGS. 3 and 3A show the piezoelectrical crystal device of the invention mounted in crystal holder 13. Springs 11 and 12 are cemented to portions of the crystal and are then secured to base 13 to provide a suitable mounting.

While I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A piezoelectric crystal device comprising a body member having two parallel, planar, opposing surfaces each surface having disposed thereon, a metallic electrode of a first thickness, two metallic mechanical loading elements of a second thickness greater than said first thickness, said two mechanical loading elements being on opposite sides of and equidistant from a line which cuts the area of the surface on which said two loading elements are disposed in half, each of said loading elements being in the shape of a chordal section of a circle.

2. A piezoelectric crystal device having a body member comprised of two opposite, parallel, planar, circular surfaces, the area of one surface being bounded by the area of the other surface, each surface having disposed thereon an electrode element and a plated metallic loading element, said electrode element being of a first thickness and said loading element being of a second thickness greater than said first thickness, each loading element being in the shape of a chordal section of the circle defined by the edge of one of said circular surfaces and being positioned on the edge of its respective surface so that its circular edge is flush with the edge of said respective surface, the area of each loading element on each surface being bounded by the area of the other loading element on the opposite surface.

3. A piezoelectric crystal device having a body member comprised of two opposite, parallel, planar, circular surfaces, each surface having disposed thereon an electrode element and a plated metallic loading element spaced from the electrode element, said electrode element being of a first thickness and said loading element being of a second thickness greater than said first thickness, each loading element further being in the shape of a chordal section of the circle defined by the circular edge of one of said circular surfaces, and being positioned so that its circular edge is flush with the circular edge of the circular surface on which it is disposed, each electrode element further being geometrically shaped to have an angular corner and being positioned so that a line passing through and bisecting said angular corner is perpendicular to the chord of said chordal section.

4. A piezoelectric crystal device as recited in claim 3 wherein each electrode element is further geometrically shaped to have two additional angular corners and is positioned so that a line passing through said two additional angular corners is perpendicular to said line passing through and bisecting said angular corner.

5. A piezoelectric crystal device as recited in claim 4 wherein each electrode element is positioned approximately in the center of the surface on which it is disposed.

6. A piezoelectric crystal device as recited in claim 5 further including a metallic tab extending from each electrode in the direction of said line passing through and bisecting said angular corner, to a point on the edge of each circular surface, said loading elements further being plated over said tabs.

7. A piezoelectric crystal device as recited in claim 6 wherein said crystal is an A-T cut crystal and wherein said line passing through and bisecting said angular corner is in the direction of the Z-axis of the crystal and wherein said line passing through said two additional angular corners is in the direction of the X-axis of the crystal.

8. A piezoelectric crystal device as recited in claim 6 wherein each loading element is spaced from each electrode element a distance between 0.001 inch and 0.01 inch.

9. A piezoelectric crystal device as recited in claim 7 further including an additional metallic loading element being plated on each surface, each additional loading element being in the shape of a chordal section of the circle defined by the edge of one of said circular surfaces and being positioned so that its circular edge is flush with the circular edge of the circular surface on which it is disposed and so that the loading elements on each surface are located on opposite sides of and equidistant from a line running through the center of each circular surface in the direction of the X-axis.

10. A piezoelectric crystal device as recited in claim 9 wherein said point on the edge of one of the circular surfaces that one of said tabs extends to is 180° removed from the point on the other of said surfaces that the other of said tabs extends to.

11. A piezoelectric crystal device as recited in claim 10 wherein said electrodes are aluminum having a thickness of about 10 A.U. and said loading elements are silver having a thickness of about 120 A.U.

* * * * *